Patented Aug. 15, 1939

2,169,369

UNITED STATES PATENT OFFICE 2,169,369

PROCESS FOR SCRUBBING GASES CONTAINING LOW BOILING ALDEHYDES

Robert H. Osterloh, Cyrus Pyle, Joe E. Voytilla, and Robert C. Ficke, Waynesboro, Va., assignors to E. I. du Pont de Nemours & Company, Wilmington, Del., a corporation of Delaware No Drawing. Application November 17, 1936, Serial No. 111,274

5 Claims. (Cl. 260—601)

This invention relates to the continuous manufacture of acetic acid by the oxidation of acetaldehyde, and particularly relates to an inexpensive improvement whereby the productive capacity of a combination system of an oxidizer and scrubber is considerably increased.

One of the more widely used commercial procedures for the continuous oxidation of acetaldehyde to acetic acid consists in leading acetaldehyde and an oxygen-containing gas to an oxidizer in the presence of a suitable catalyst. However, this procedure has the drawback that more or less quantities of acetaldehyde remain unoxidized and are carried out of the oxidation chamber in the exit gases, together with a slight amount of entrained acetic acid. In order to make the process more economically feasible, therefore, it is necessary to have a scrubbing tower connected to the oxidizer so that the aldehyde and acetic acid may be scrubbed from the exit gases and recovered. In the scrubber the gases are introduced from the bottom and washed counter-currently with water flowed from the top of the column.

In the past, efforts have been made to increase the productive capacity by passing the oxygen-containing gas through the system at a more rapid rate, but this procedure has been accompanied by the loss of aldehyde and acetic acid escaping with the gases vented from the scrubber.

The discovery has now been made that considerable foaming occurs in the scrubber. This phenomenon is surprising since the constituents of the oxidation gases entering the scrubber and the washing solution therein would not have been expected to have been capable of producing a foam.

It has further been found that by removal or prevention of foam in the scrubber, it is possible to admit the oxygen-containing gas into the oxidizer-scrubber system at a greatly accelerated rate without incurring the difficulties encountered prior to this invention, namely, substantial loss of acetaldehyde and acetic acid from the top of the scrubber.

It has also been found that this foam in the scrubber may be obviated by the addition of a small amount of certain substances which would normally change the surface tension of the scrubber liquor.

It is one object of the present invention to increase, without substantial addition to or alteration of equipment, the productive capacity of a particular system consisting of an aldehyde oxidizer and a scrubber in combination.

It is a further object of the present invention to pass the oxygen-containing gas through the oxidation system at a greatly accelerated rate.

Specifically, it is the object of the invention to eliminate substantially all foam formation in the scrubber, so that more oxygen-containing gas and more aldehyde may be passed through the oxidizer-scrubber system per unit of time.

More specifically, it is the object of the invention to scrub the aldehyde from the exit oxidizer gas in a medium relatively free of any foam and to scrub the acetic acid from the exit gases in a medium relatively free of any foam.

In accordance with the invention, a small quantity of a foam inhibitor is added to the scrubber fluid and the aldehyde and acetic acid are scrubbed from the oxidizer exit gases in a water medium which is substantially free of any foam.

In the preferred embodiment of the invention, foam in the scrubber is prevented by the continual introduction of a very small amount of soap, such as sodium or potassium salts of stearic or oleic acid. Aldehyde and oxygen-containing gas are introduced continuously into the oxidizer at approximately twice the usual rate and the aldehyde smoothly oxidized to acetic acid in the presence of a suitable catalyst, such as manganese acetate or ferric acetate. Since the scrubber is substantially free of any foaming, no difficulty is experienced in continuously scrubbing efficiently the exit oxidation gases at a greatly increased rate.

As illustrative of the invention, an example will now be given but it is to be understood that the same is in no wise limitative.

Example

Into an oxidizer is introduced acetaldehyde at the rate of 850 pounds per hour, and air at 9,000 cu. ft. per hour at 16 pounds gage pressure and 70° C. The usual catalyst is added in the usual concentration and amount. The reaction is exothermic and cooling means are provided to maintain the temperature at approximately 40–70° C. The reaction proceeds smoothly with a 94–97% conversion of acetaldehyde to acetic acid. The gases emerging from the oxidizer contain a trace of acetic acid and approximately 2.0% of acetaldehyde, which are removed by continuously passing the gases upward through a scrubber down which flows water containing a trace or about 1 part of soap (sodium stearate) in 100,000 parts of scrubber liquid, which effectively prevents the formation of any foam. If no soap or like foam inhibitor is added, foaming occurs in the scrubber and it is virtually impossible to secure from the system a through-put of aldehyde greater than 425 pounds per hour. The aldehyde and acetic acid are separated and recovered from the water solution by usual distillation methods.

It will be recognized by those skilled in the art that the soap cited in the example may be replaced with other suitable foam inhibitors, such as Turkey red oil, stearic, palmitic or like higher fatty acids, light mineral oils, sulfonated castor oil, sulfonated olive oil, and amyl alcohol; due cognizance being taken of the action of the particular foam inhibitor with respect to the acetaldehyde. In general, we prefer to add the foam inhibitor in an amount somewhat less than the quantity of acid present in the exit oxidation gases that are to be scrubbed.

While the invention in its preferred form, is concerned with the oxidation of acetaldehyde to acetic acid, it will be recognized that the invention is generally applicable to any oxidation process characterized by a scrubber in combination with an oxidation chamber wherein there is a tendency for foam to occur during the scrubbing of volatile substances from the exit oxidation gases. Thus, the process of the invention is equally suitable to the recovery of aldehydes from the exit gases evolved in the oxidation of propionaldehyde and like low boiling aldehydes.

One outstanding advantage of the invention resides in its lowering the production costs of these acids which are used to a considerable extent in industries for a large variety of purposes. This decrease in production cost is due obviously to the material increase of the production capacity of a given oxidizer-scrubber system without substantial change or modification of equipment and without change of temperature or pressure conditions.

It is intended that any variation or modification which conforms to the spirit of the invention be included within the scope of the claims.

We claim—

1. The process which comprises scrubbing the exit gases issuing from the oxidation of a low boiling aldehyde with a scrubbing liquid containing an agent which will inhibit foam formation.

2. The process which comprises scrubbing the exit gases issuing from the oxidation of acetaldehyde to acetic acid with water in the presence of an agent which will inhibit foam formation.

3. The process which comprises scrubbing the exit gases issuing from the oxidation of acetaldehyde to acetic acid with water containing an agent which will inhibit foam formation.

4. The process which comprises scrubbing the exit gases issuing from the oxidation of acetaldehyde to acetic acid with water containing a soap which will inhibit foam formation.

5. The process which comprises scrubbing the exit gases issuing from the oxidation of acetaldehyde to acetic acid with water containing a soap of a higher fatty acid which will inhibit foam formation.

ROB'T H. OSTERLOH.
CYRUS PYLE.
JOE E. VOYTILLA.
ROBERT C. FICKE.